May 17, 1932.   O. BARNACK   1,858,385
PHOTOGRAPHIC CAMERA
Filed Sept. 3, 1931   2 Sheets-Sheet 1

INVENTOR-
Oskar Barnack
BY
ATTORNEY-

May 17, 1932.  O. BARNACK  1,858,385
PHOTOGRAPHIC CAMERA
Filed Sept. 3, 1931  2 Sheets-Sheet 2
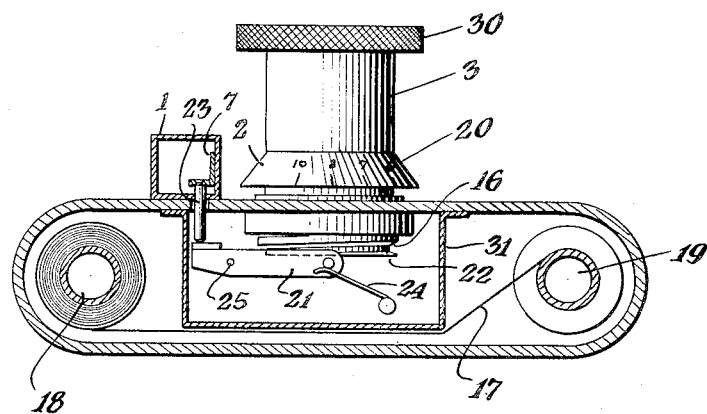
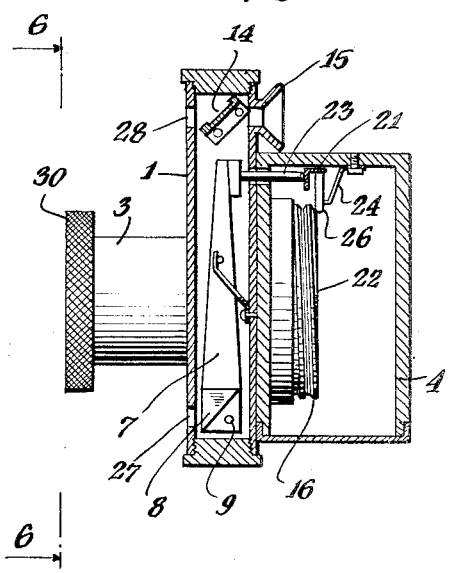
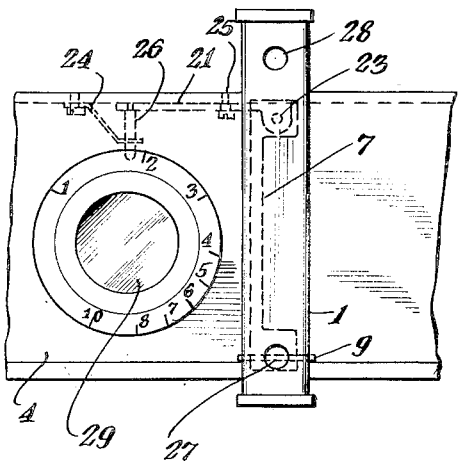
INVENTOR-
Oskar Barnack
BY
George C. Heinrich
ATTORNEY- Patented May 17, 1932

1,858,385

UNITED STATES PATENT OFFICE

OSKAR BARNACK, OF WETZLAR, GERMANY, ASSIGNOR TO ERNST LEITZ OPTISCHE WERKE, OF WETZLAR, GERMANY

PHOTOGRAPHIC CAMERA

Application filed September 3, 1931, Serial No. 560,987, and in Germany October 18, 1930.

This invention relates to improvements in cameras, particularly to an adjusting device for small photographic cameras, by means of a distance finder firmly connected with the camera.

While I am aware of the fact that such devices are known, I have invented a device which avoids all disadvantages incident to the known devices which include one or a plurality of bevelled or inclined faces, or cams, to produce the mirror movement by means of specifically and accurately made carriage or roller guides which represent a complicated mechanism within the housing of the camera and make the same therefore materially expensive.

Furthermore, even the most careful production of such carriage or roller guides will not allow such an accurate adjustment of the short focal distance of objectives as absolutely required and necessary with small cameras.

My invention has for its object to produce a device avoiding all these disadvantages by devising means for allowing an adjustment of the objective and a movable mirror within the distance finder without the use of a bevel face or cam or roller guide.

According to my invention the adjustment of the mirror is effected by means of a lever system producing lever pressure, without the necessity of using a special carriage, by means of the worm guide used for the adjustment of the objective.

It is well known that such worm guides allow the most accurate adjustment of the objective and in its preferred form my device is mainly intended for use with such guides, it is in this instance immaterial whether the objective is adjusted by a turn about its own axis or whether it is only parallelly displaced when adjusted within the worm guide.

These and other objects of my invention will become more fully known, as the description thereof proceeds, and will then be more specifically defined in the appended claims.

In the accompanying drawings forming a material part of this disclosure:

Fig. 4 is a sectional plan view of a modified form of camera.

Fig. 5 is a sectional side elevation thereof.

Fig. 6 is a fragmentary front elevation of the modified camera seen in the direction of line 6—6 of Figure 5.

Figure 1:
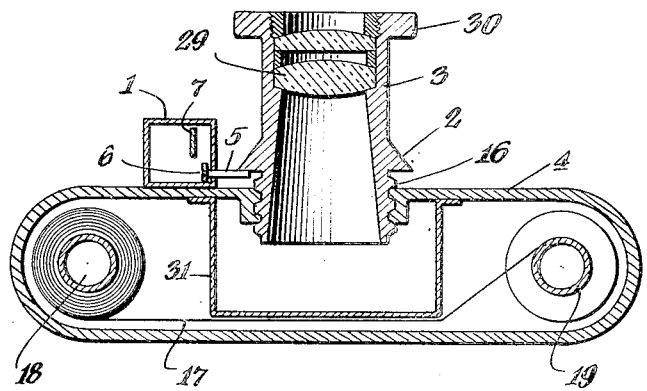
Fig. 1 is a sectional plan view of a camera constructed according to my invention.
Figure 2:
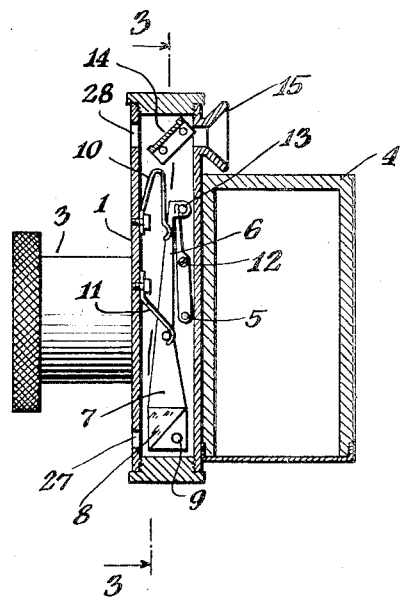
Fig. 2 is a sectional side elevation thereof, the section being taken on line 2—2 of Figure 3.
Figure 3:
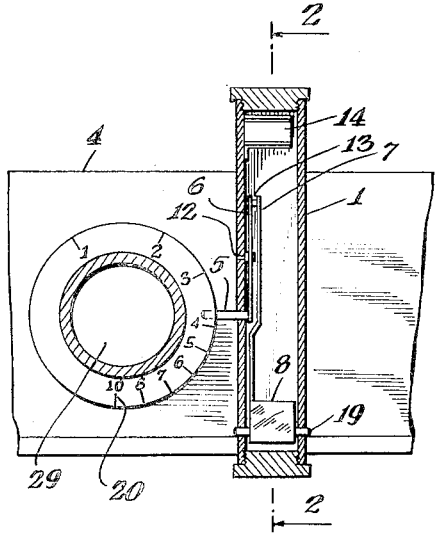
Figure 3 is a fragmentary front elevation of the camera, partly in section on line 3—3 of Figure 2.

As illustrated, in Figures 1 to 3, a camera preferably of the smaller type not using a bellows, has a distance finder 1 and a special ring or rim 2 upon the objective mounting 3 including its worm 16 for the adjustment of the objective. This ring 2 carries the graduations 20 for the indication of the distances and the worm gear 16 is arranged within the camera housing 14 and carries in the front part of its mounting the objective 29.

Against ring 2 presses elastically a pin 5 of lever 6. The lever 6 operates another lever 7 within the distance finder 1 and in this manner influences a mirror 8 movably arranged about pin 9.

The springs 10 and 11 press against the system of levers in such manner as to press pin 5 laterally against ring 2.

The lever 6 which is turnable about pin 12 is equipped with a projection 13 engaging lever 7.

In the modified form of my camera illustrated in Figures 4, 5, and 6, a pin 26 of lever 21 is held by means of a spring 24 permanently against the rear margin 22 of the worm 16 said lever 21 against pivot 25. Another pin 23 transmits the lever motion upon lever 7 within the distance finder 1. The mirror 14 is firmly arranged within the distance finder and is silvered so as to be half pervious to light and is arranged between the eye piece 15 and a window 28.

A second window 27 is closely provided in front of mirror 8. A rifled rim 30 allows a convenient operation of the worm 16 during the adjustment of the objective.

The spools 18 and 19 take the roll film 17 guided across the light stage 31.

It will be understood that I have disclosed the preferred form of my device as one example only of the many possible ways to practically construct the same and that I may make such changes in its general arrangement and combination of parts and construction of the minor details thereof, as come within the scope of the appended claims without departure from the spirit of my invention and the principles involved.

Having thus described my invention, what I claim as new and desire to secure by Letters Patent is:

1. In a camera having a distance finder an objective, and its mounting, a special rim on said mounting bearing graduations for indicating the distances, a worm gear on said mounting within the camera housing, a system of levers within the distance finder, a mirror, movable in said distance finder, and a spring controlled pin on one of the levers of said system adapted to be pressed against said rim to transmit the axial movement of the objective to said mirror within the distance finder.

2. In a camera preferably of the smaller type, including its distance finder, a lever within the same, a mirror on said lever, an objective mounting, a rim on the same, a worm for axially displacing the same, a lever permanently held against the rear margin of the worm, and a pin adapted to be operated by said lever held against the worm to transmit the motion of said lever upon the lever carrying said mirror.

3. In a camera preferably of the smaller type, including its objective and mounting, a worm for allowing the axial displacement of said objective, a lever engaging the rear end of said worm, a spring for permanently holding said lever in engagement with said worm, said lever pivoted intermediate its end, a distance finder, spring controlled lever therein, a mirror on said lever silvered so as to be half pervious to light, and a pin actuated by the lever engaging said worm to operate said lever carrying the mirror upon the operation of said worm.

4. In combination, a camera, a finding mechanism thereon, a focusing mechanism, a mounting therefor, a rim mounted on said mounting and bearing the numerals for indicating the distance, a system of levers within said finding mechanism, a pin on one of the levers of said system engaging said rim to transmit its motion to the other lever of the system, a mirror for allowing a transmission of the axial movement of the focusing mechanism to said mirror within the finding mechanism.

Signed at Frankfort-on-the-Main, Germany, this 14th day of August, A. D. 1931.

OSKAR BARNACK.